(12) United States Patent
Kaida et al.

(10) Patent No.: US 8,295,539 B2
(45) Date of Patent: Oct. 23, 2012

(54) METHOD AND SYSTEM OF IMMERSIVE SENSATION ENHANCEMENT FOR VIDEO SEQUENCE DISPLAYING

(75) Inventors: Xiao Kaida, Gyeonggi-do (KR); Ho Young Lee, Gyeonggi-do (KR); Ji Young Hong, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1238 days.

(21) Appl. No.: 12/061,921

(22) Filed: Apr. 3, 2008

(65) Prior Publication Data
US 2009/0147986 A1 Jun. 11, 2009

(30) Foreign Application Priority Data
Dec. 7, 2007 (KR) .................. 10-2007-0127164

(51) Int. Cl.
*G06K 9/00* (2006.01)
*G06K 9/40* (2006.01)
(52) U.S. Cl. ........................ 382/100; 382/274
(58) Field of Classification Search .............. 382/100, 382/107, 173, 270, 274
See application file for complete search history.

(56) References Cited

U.S. PATENT DOCUMENTS

| 5,109,425 A * | 4/1992 | Lawton ............ 382/107 |
| 7,003,154 B1 * | 2/2006 | Peker et al. ............ 382/173 |
| 2003/0152285 A1 * | 8/2003 | Feldmann et al. ............ 382/274 |
| 2003/0214630 A1 * | 11/2003 | Winterbotham ............ 351/203 |

FOREIGN PATENT DOCUMENTS

| KR | 2001-23561 | 3/2001 |
| KR | 2001-23596 | 3/2001 |
| KR | 2007-68729 | 7/2007 |

* cited by examiner

*Primary Examiner* — Yon Couso
(74) *Attorney, Agent, or Firm* — Staas & Halsey LLP (57) ABSTRACT

An immersive sensation enhancement method and system for video sequence displaying is provided. An immersive sensation enhancement system, the system including: a foreground image identification unit to identify a foreground image for each frame of an input image; a foreground image characteristic extraction unit to extract a characteristic of the foreground image; a contrast threshold identification unit to identify a contrast threshold based on the characteristic of the foreground image; and an immersive sensation enhancement processing unit to process an immersive sensation enhancement of the input image based on at least one of the characteristic of the foreground image and the contrast threshold.

22 Claims, 10 Drawing Sheets

METHOD AND SYSTEM OF IMMERSIVE SENSATION ENHANCEMENT FOR VIDEO SEQUENCE DISPLAYING

CROSS-REFERENCE TO RELATED APPLICATION

This application claims the benefit of Korean Patent Application No. 2007-127164, filed on Dec. 7, 2007 in the Korean Intellectual Property Office, the disclosure of which is incorporated herein by reference.

BACKGROUND OF THE INVENTION

1. Field of the Invention

Aspects of the present invention relate to an immersive sensation enhancement method and system for video sequence displaying based on movement information.

2. Description of the Related Art

An immersive sensation is a type of human sensation including realism, involvement, a sense of actually being there, and the like. As a size of a display such as a television, a projector, and a cinema screen increases, human beings may have a more immersive sensation and thus have a more favorable impression. A conventional art for immersive sensation enhancement is an immersive generation method of a two-dimensional still image. The conventional art generates the immersion by changing a lightness, a saturation, and a hue of at least one of a foreground image and a background image based on a difference between the foreground image and the background image of the inputted two-dimensional stop image.

Therefore, an immersive sensation enhancement method and system for video sequence displaying based on movement information is needed.

SUMMARY OF THE INVENTION

Aspects of the present invention provide an immersive sensation enhancement method and system which can acquire movement information of a foreground image using at least one of a position and an area of the foreground image in an entire image for each frame of an input image, and enhance an immersive sensation of the input image based on the movement information.

Aspects of the present invention also provides an immersive sensation enhancement method and system which can enhance an immersive sensation of an input image by enhancing at least one of a contrast and a saturation of a foreground image based on a position and an area affecting human retinal eccentricity and a reflected retina size.

According to an aspect of the present invention, there is provided an immersive sensation enhancement system, the system including: a foreground image identification unit to identify a foreground image for each frame of an input image; a foreground image characteristic extraction unit to extract a characteristic of the foreground image; a contrast threshold identification unit to identify a contrast threshold based on the characteristic of the foreground image; and an immersive sensation enhancement processing unit to process an immersive sensation enhancement of the input image based on at least one of the characteristic of the foreground image and the contrast threshold.

In an aspect of the present invention, the foreground image identification unit includes: an information detection unit to detect color information and smoothness information of a background image of the input image; a boundary detection unit to detect a boundary of the background image based on the color information; and a boundary smoothing unit to smooth the boundary based on the smoothness information.

In an aspect of the present invention, the foreground image characteristic extraction unit includes: a position identification unit to identify a position of the foreground image in an entire area of the frame; an area identification unit to identify an area corresponding to the foreground image in the entire area; and a lightness and saturation calculation unit to calculate an average lightness and an average saturation of the foreground image. In this instance, the position and the area of the foreground image are calculated by a unit of a degree corresponding to human retinal eccentricity.

In an aspect of the present invention, the contrast threshold identification unit identifies the contrast threshold based on a position and an area of the foreground image from the characteristic of the foreground image, the position and the area affecting human retinal eccentricity and a reflected retina size.

In an aspect of the present invention, the immersive sensation enhancement processing unit includes: a contrast enhancement unit to enhance a contrast of the foreground image based on the contrast threshold and the characteristic of the foreground image. Also, the contrast enhancement unit enhances the contrast to an average lightness of the foreground image based on a sigmoidal function.

According to another aspect of the present invention, there is provided an immersive sensation enhancement system, the system including: a movement information identification unit to identify movement information of a foreground image between frames of an input image; and an immersive sensation enhancement processing unit to process an immersive sensation enhancement of the input image based on the movement information.

According to still another aspect of the present invention, there is provided an immersive sensation enhancement method, the method including: identifying a foreground image for each frame of an input image; extracting a characteristic of the foreground image; identifying a contrast threshold based on the characteristic of the foreground image; and processing an immersive sensation enhancement of the input image based on at least one of the characteristic of the foreground image and the contrast threshold.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

Figure 1:
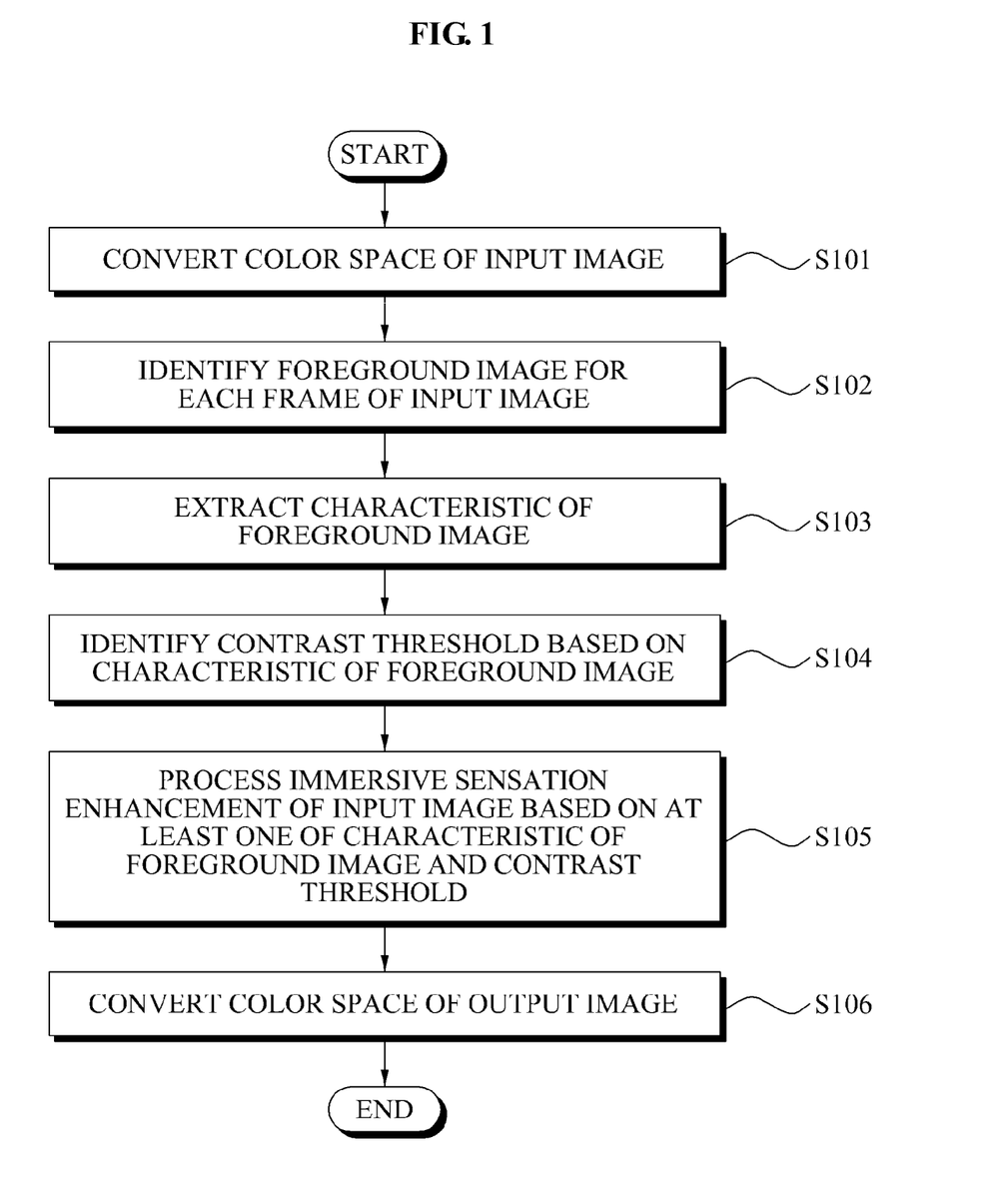
FIG. 1 is a flowchart illustrating an immersive sensation enhancement method according to an embodiment of the present invention.

FIG. 1 is a flowchart illustrating an immersive sensation enhancement method according to an embodiment of the present invention.

In operation S101, an immersive sensation enhancement system processing an immersive sensation enhancement converts a color space of an input image. The color space of the input image is a Red Green Blue (RGB) digital signal and is unassociated with a human visual system. Accordingly, the color space may not be directly used for immersive sensation generation. Specifically, a human perceptual attribute such as a lightness, a saturation, and a hue expressed as a final output of the human visual system may be used for the immersive generation.

Many color spaces for converting the RGB digital signal into the three human perceptual attributes exist. For example, 'CIECAM02' is mainly used for accurate color display estimation, and 'CIELAB' is mainly used for evaluating a difference of at least one of a color and an image. Also, 'HSV' is mainly used for a color design and simple industrial applications. All color spaces for converting the RGB digital signal into the three human perceptual attributes may be applied to the present embodiment of the present invention. In this instance, as illustrated in table 1, different names and different abbreviations of the three human perceptual attributes may be applied to each color space.

TABLE 1

| Color space | Lightness or Brightness | Saturation or Chroma | Hue |
| --- | --- | --- | --- |
| CIECAM02 | Lightness (J) | Chroma (C) | Hue (H) |
| LCH | Lightness (L) | Chroma (C) | Hue (H) |
| HSV | Brightness (B or V) | Saturation (S) | Hue (H) |

Since 'CIECAM02' is used for mathematical models and experimental evaluations, the present embodiment of the present invention uses the abbreviations 'J', 'C', and 'H' respectively corresponding to the lightness, the saturation, and the hue. At least one of scaling parameters and a threshold may have a difference in different used models even when a structure and an equation are similarly provided. For 'CIECAM02' or 'CIELAB', device characterization based on the relationships between the RGB digital signal and CIE colorimetry (CIE XYZ) needs to be performed. For different displays, different methods may be used. In this instance, the two most common methods are a GOG model and a PLCC model. The GOG model may be mainly used for a device having a linear or power gamma curve, such as cathode-ray tube (CRT) displays, and the PLCC model may be used for devices having an irregular gamut curve such as liquid crystal displays (LCDs) and organic light emitting diode (OLED) mobile displays.

In operation S102, the immersive sensation enhancement method identifies a foreground image for each frame of the input image. Operation S102 may be performed by separating the foreground image and a background image. The background image is more uniform than the foreground image and has a low frequency of change, whereas the foreground image has a complex and high frequency of change. Accordingly, a frame difference of the input image may be considered as a factor to identify either a background or the foreground image being a moving object. For this, the immersive sensation enhancement method may identify the foreground image by detecting color information and smoothness information of the background image of the input image, detecting a boundary of the background image based on the color information, and subsequently smoothing the boundary based on the smoothness information.

The frame may be divided by different color areas based on different hues and different saturations. Accordingly, the immersive sensation enhancement system first calculates a ratio of a pixel included in each color area of a whole image, for example, a percentage, and calculates a smoothness of each color area. Specifically, the immersive sensation enhancement method may determine whether the color area is the background image based on the ratio calculated according to the color information and the smoothness. Also, the immersive sensation enhancement system assigns a background color to the color area determined to be the background image. For example, the immersive sensation enhancement system may assign the background color by changing all the color areas determined to be the background image into a black color. Finally, the immersive sensation enhancement method smoothes the boundary of the background image.

Figure 2:
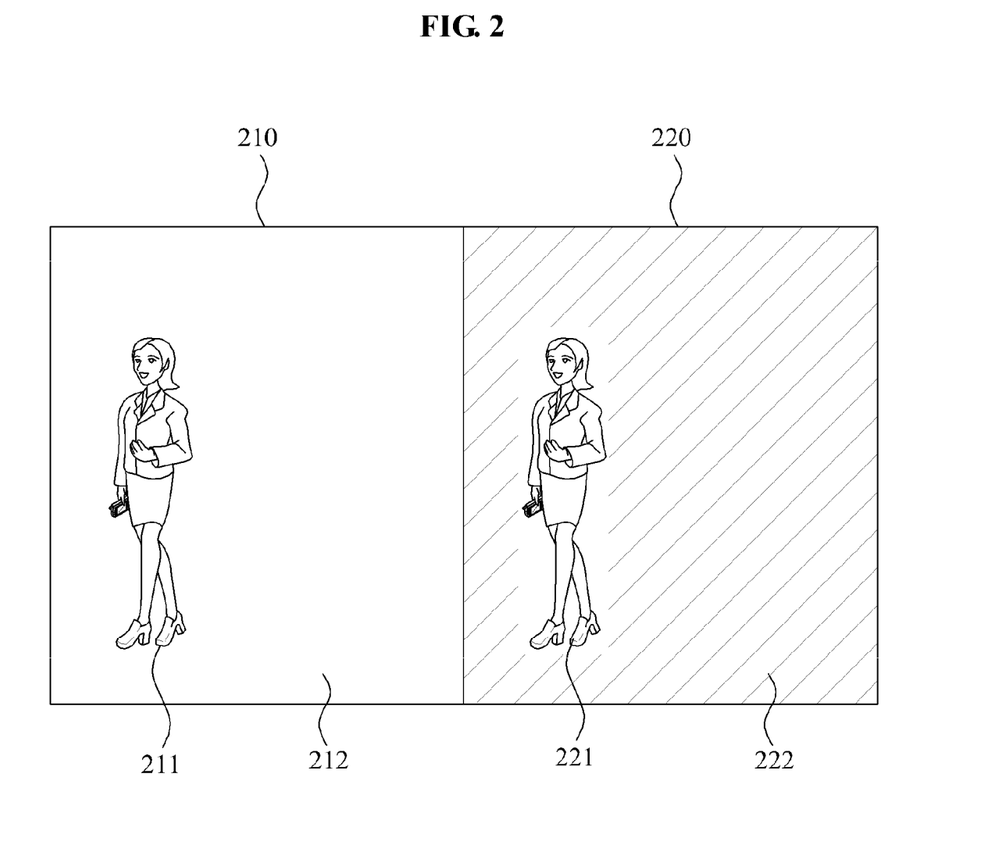
FIG. 2 illustrates an image in which a foreground image is separated based on an original image and color information according to an embodiment of the present invention.

FIG. 2 illustrates an image in which a foreground image is separated based on an original image and color information according to an embodiment of the present invention. Specifically, a background color may be assigned to a color area by identifying the color area corresponding to a background image 212 from among a foreground image 211 being a moving object and the background image 212 of an original image 210. Accordingly, as illustrated in a result image 220, a foreground image 221 may be unchanged and a color of a background image 222 may be changed into the background color. In FIG. 2, diagonal lines of the result image 220 represent that a color of the background image 222 is changed into the background color.

In operation S103, the immersive sensation enhancement system extracts a characteristic of the foreground image. The present embodiment of the present invention uses four characteristics for the immersive sensation enhancement of the foreground image identified in operation S102.

The first characteristic is a position of the foreground image, and denotes the position of the foreground image in an entire area of the frame. In this instance, a center position of the foreground image may be calculated using an average of positions of each pixel in the foreground image. For example, the center position of the foreground image may be in accordance with Equation 1:

$$\overline{x_F} = \frac{\sum_{0}^{i_F} x}{i_F}, \quad \overline{y_F} = \frac{\sum_{0}^{i_F} y}{i_F},$$ [Equation 1]

where 'x' and 'y' respectively denote a vertical position and a horizontal position of a pixel included in a foreground image, '$\overline{x_F}$' and '$\overline{y_F}$' respectively denote a center position of the foreground image, and '$i_F$' denotes a number of all pixels included in the foreground image.

Since the position of the foreground image is directly related to human retinal eccentricity, the center position may be expressed by a unit of a degree using Equation 2:

$$P = 2\tan^{-1}\left(\frac{\sqrt{(\overline{x_F} - \overline{x})^2 + (\overline{y_F} - \overline{y})^2}}{\sqrt{\overline{x}^2 + \overline{y}^2}}\right),$$ [Equation 2]

where '$\overline{x}$' and '$\overline{y}$' respectively denote a center position of an entire area, and 'P' denotes a center position of a foreground image expressed by a unit of a degree. According to Equation 2, when a center of the foreground image is identical to a center of the entire area, the center position of the foreground image may be equal to 0°, and when the foreground image exists at the edge of the entire area, the center position of the foreground image may be equal to 90°.

Figure 3:
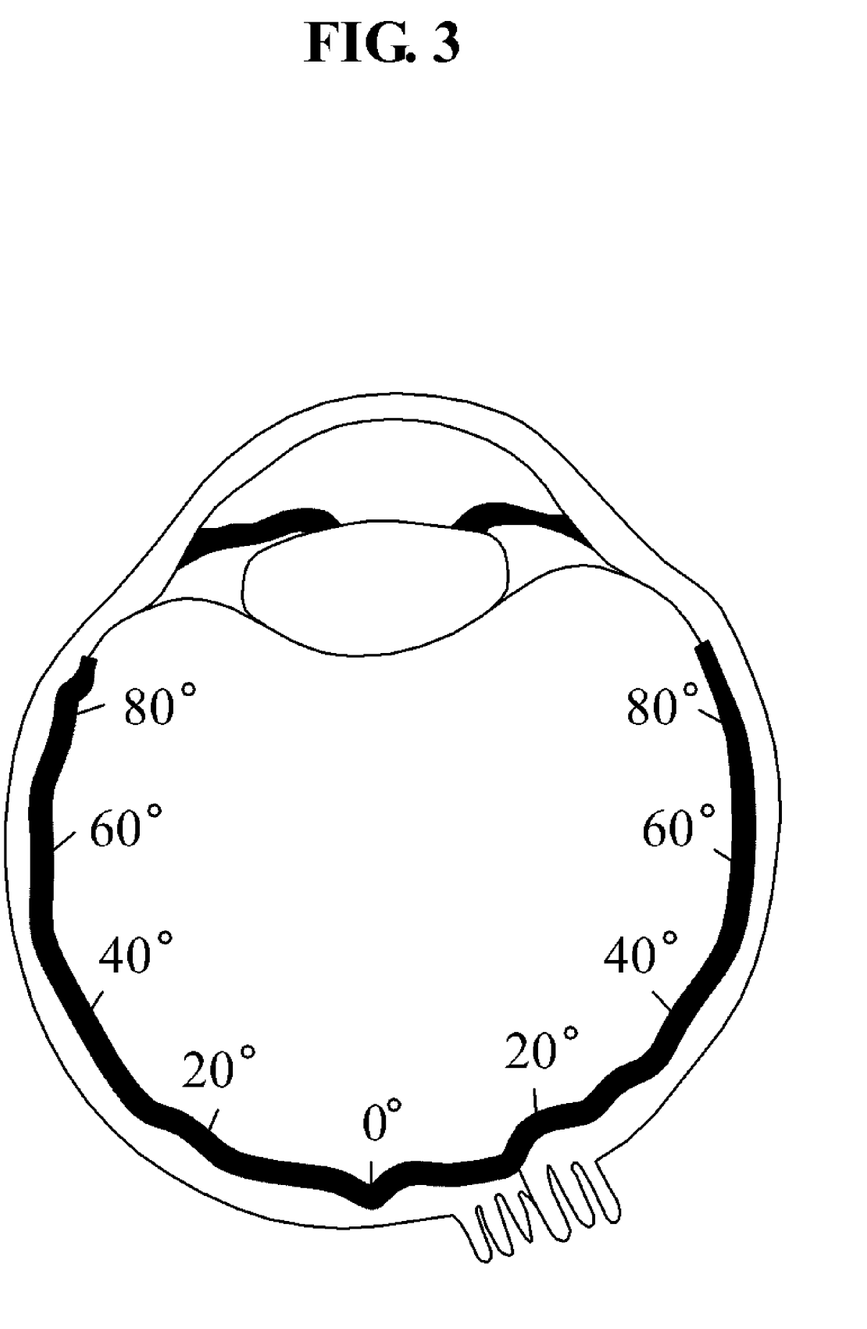
FIG. 3 illustrates a human retina.
Figure 4:
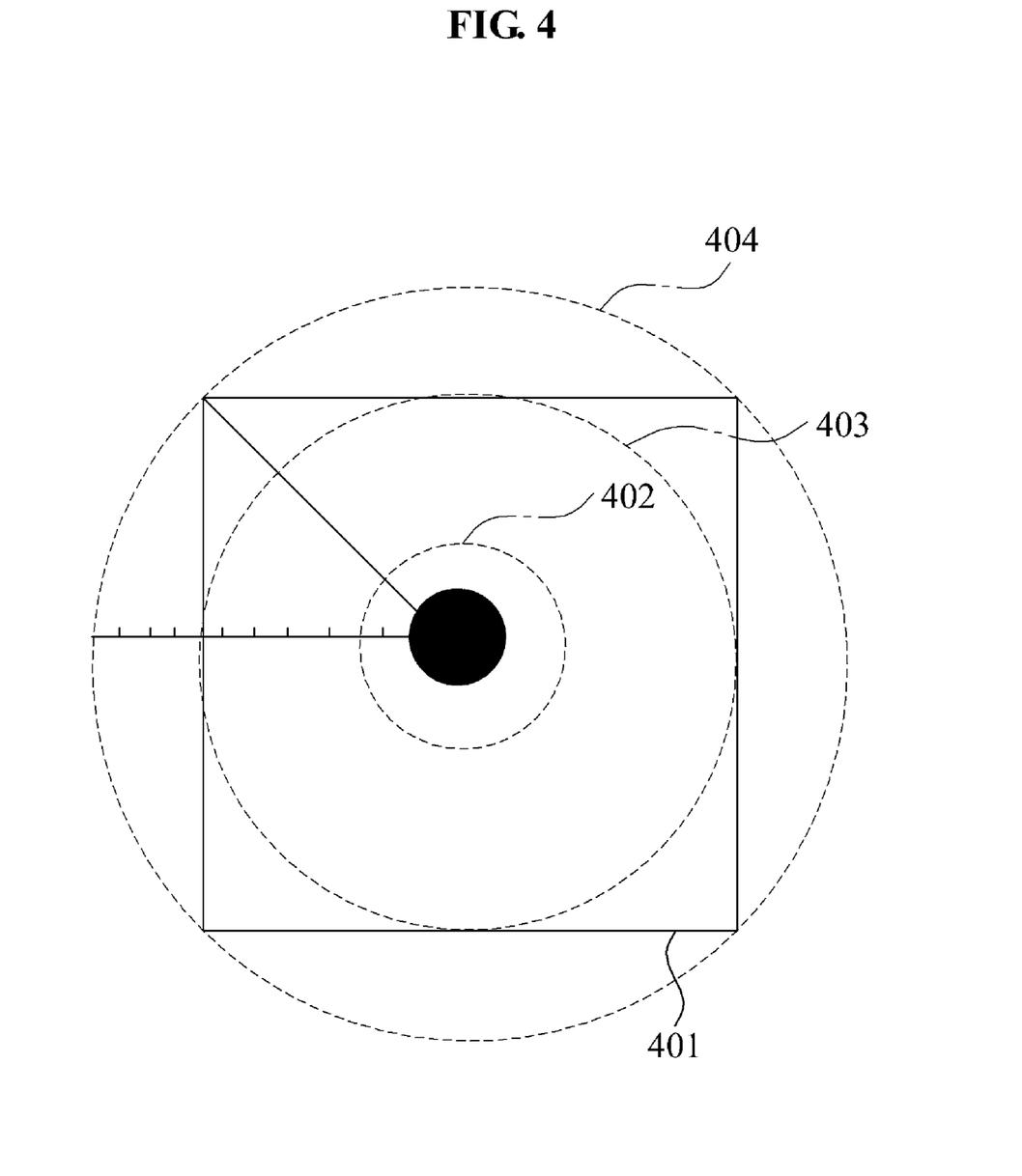
FIG. 4 illustrates a position of a foreground image expressed by a unit of a degree according to an embodiment of the present invention.

FIG. 3 illustrates a human retina according to an embodiment of the present invention. FIG. 4 illustrates a position of a foreground image expressed by a unit of a degree according to an embodiment of the present invention. Specifically, a center position of the foreground image is denoted by a degree in a whole image 401. For example, circles 402 through 404 expressed by dotted lines may denote possible positions when the center position is respectively 30°, 60°, and 90°, and the degree of the center position may correspond to the degree displayed on the retina in FIG. 3.

The second characteristic is an area of the foreground image and is directly related to a size of an image projected onto the human retina. Accordingly, the area may be also expressed by a unit of a degree. For example, the area may be in accordance with Equation 3:

$$A = 2\tan^{-1}\left(\frac{i_F}{i}\right),$$ [Equation 3]

where '$i_F$' denotes a number of all pixels in a foreground image as described above, and '$i$' denotes a number of all pixels in an entire area. In this case, an area of the foreground image 'A' may cover 0° to 90°, and when the area 'A' covers the entire area, the area 'A' is equal to 90°.

The third characteristic and the fourth characteristic may be an average lightness and an average saturation of the foreground image, and be calculated by each average of a lightness and a saturation of each pixel included in the foreground image. For example, the average lightness and the average saturation may be calculated using Equation 4:

$$\overline{J} = \frac{\sum_{0}^{i_F} J}{i_F}, \quad \overline{C} = \frac{\sum_{0}^{i_F} C}{i_F},$$ [Equation 4]

where 'J' denotes a lightness of a pixel, '$\overline{J}$' denotes an average lightness, 'C' denotes a saturation of a pixel, and '$\overline{C}$' denotes an average saturation.

The above-described four characteristics may be used for enhancing the foreground image in subsequent operations S104 and S105.

In operation S104, the immersive sensation enhancement method identifies a contrast threshold based on the characteristic of the foreground image. It is well-known that contrast sensitivity of human eyes is highly related to both the retinal eccentricity and the reflected retina size. Wherein the reflected retina size may mean size of the image projected onto the retina. In this instance, as the reflected retina size increases, the contrast threshold linearly increases, and as the retina eccentricity increases in a fixed area, the contrast threshold linearly decreases. Accordingly, the present embodiment of the present invention may respectively denote the position and the area of the foreground image by the retinal eccentricity and the reflected retina size.

Human eye response for various positions and areas of the foreground image may be expressed by scaling factors '$K_A$' and '$K_P$'. In this case, the contrast thresholds '$K_C$' and the scaling factors '$K_A$' and '$K_P$' may be calculated or expressed in accordance with Equation 5 through Equation 7:

$$K_C = 10 K_A K_P,$$ [Equation 5]

$$\begin{cases} K_A = \alpha_A A + \beta_A, & A > 10° \\ K_A = 1, & A \le 10° \end{cases},$$ [Equation 6]

$$\begin{cases} K_P = \beta_P - \alpha_P P, & P > 10° \\ K_P = \beta_P, & P \le 10° \end{cases},$$ [Equation 7]

where 'A' denotes an area of a foreground image, and 'P' denotes a position of the foreground image. Also, '$\alpha_A$', '$\beta_A$', '$\alpha_P$', and '$\beta_P$' are predetermined real numbers. For example, '$\alpha_A$' and '$\beta_A$' are equal to 0.9626 and 0.00374, and '$\alpha_P$' and '$\beta_P$' are equal to 1.5374 and −0.00374.

Also, a value of 10° may be set as a threshold for a contrast processing. When the area of the foreground image is smaller than 10°, there is no processing. When the center position of the foreground image is located within 10°, the enhancement reaches the maximum.

Figure 5:
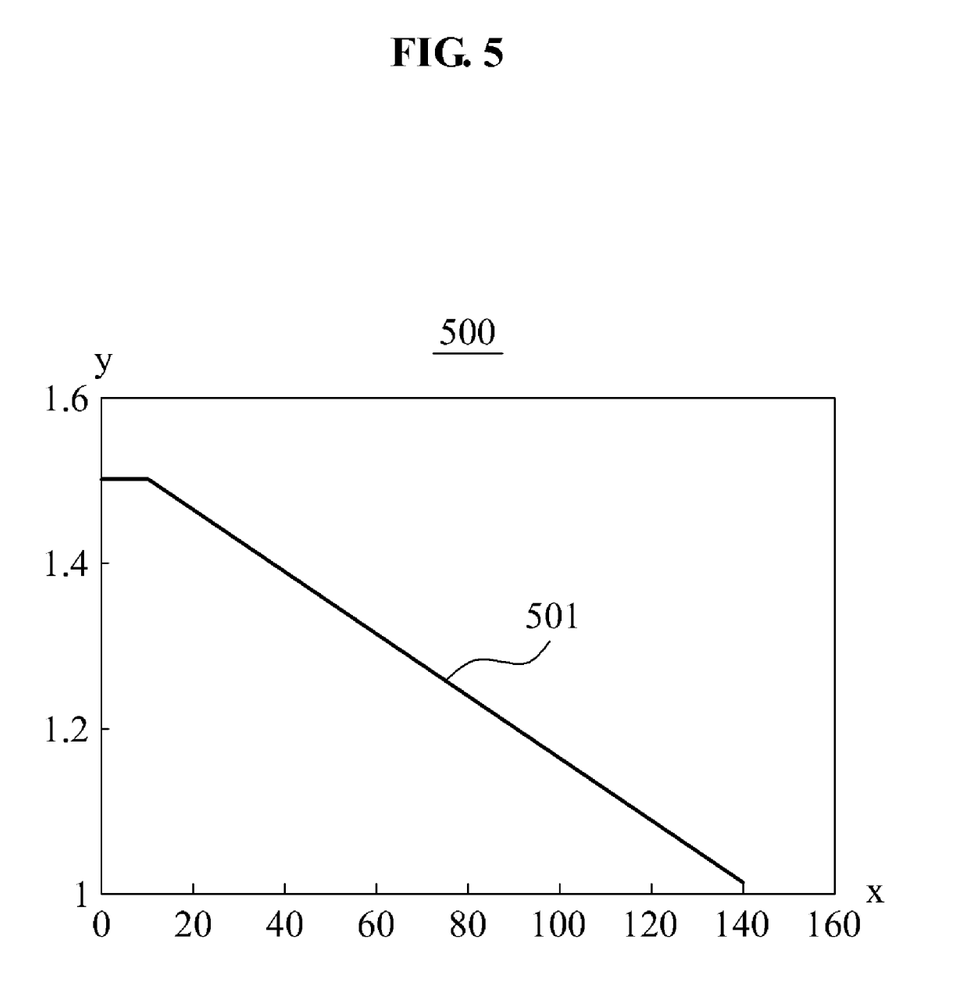
FIG. 5 illustrates a relationship between a position of a foreground image and a contrast threshold for human eye response according to an embodiment of the present invention.
Figure 6:
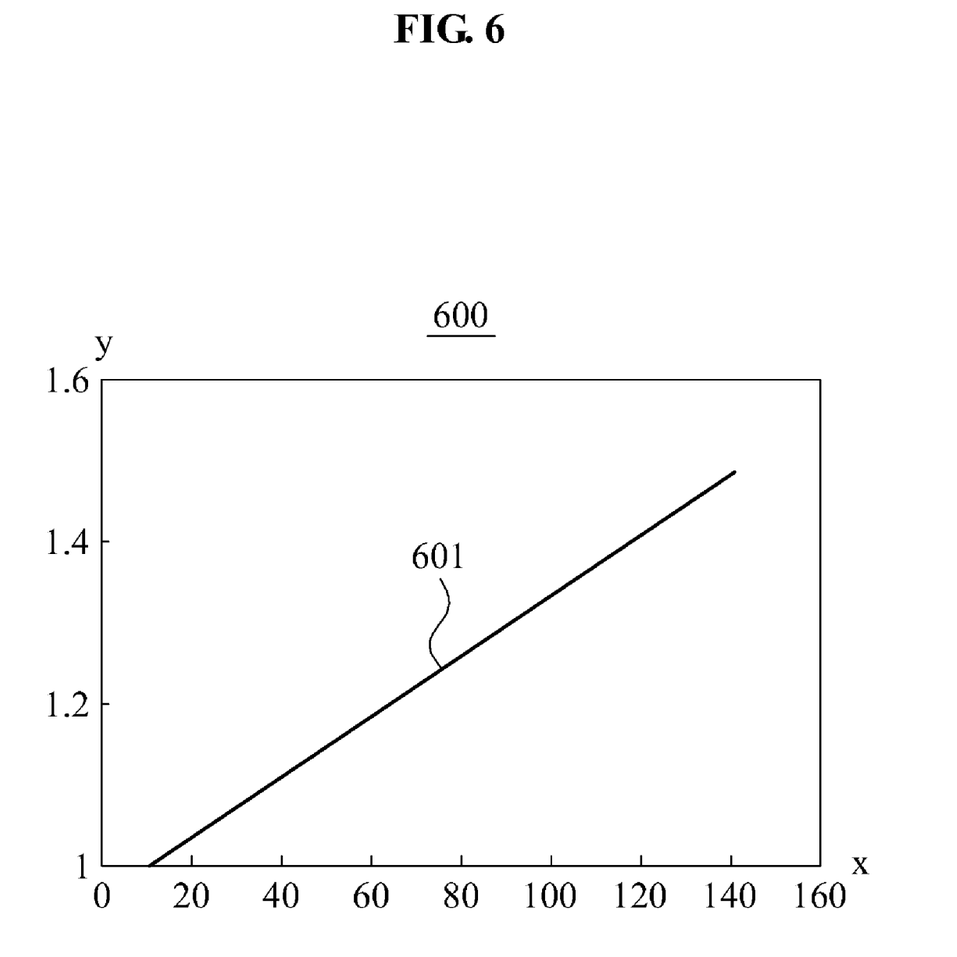
FIG. 6 illustrates a relationship between an area of a foreground image and a contrast threshold in human eye response according to an embodiment of the present invention.

FIG. 5 illustrates a relationship between a position of a foreground image and a contrast threshold for human eye response according to an embodiment of the present invention. FIG. 6 illustrates a relationship between an area of a foreground image and a contrast threshold for human eye response according to an embodiment of the present invention.

FIG. 5 and FIG. 6 may be embodied by the above-described Equation 6 and the above-described Equation 7. Here, in a graph 500, x-axis denotes the position of the foreground image expressed by a unit of a degree, and y-axis denotes a value of '$K_P$' from among scaling factors. In a graph 600, x-axis denotes the area of the foreground image expressed by the unit of the degree, and y-axis denotes a value of '$K_A$' from among the scaling factors. Specifically, a line 501 denotes that the position is linearly inverse proportional to the value of the scaling factor '$K_P$' by setting a threshold of 10° as a reference point, and a line 601 denotes that the area is linearly inverse proportional to the value of the scaling factor '$K_A$' by setting a threshold of 10° as a reference point.

In operation S105, the immersive sensation enhancement system processes an immersive sensation enhancement of the input image based on at least one of the characteristic of the foreground image and the contrast threshold.

In this instance, the immersive sensation enhancement system may enhance a contrast of the foreground image based on the contrast threshold and the characteristic of the foreground image. For this, the immersive sensation enhancement system may enhance the contrast to an average lightness of the foreground image based on a sigmoidal function. A lightness contrast enhancement is performed for the foreground image. The sigmoidal function is based on a phenomenon of simultaneous lightness contrast, which is to make dark colors look darker by making light colors look lighter. The sigmoidal function may be controlled by two factors '$x_0$' and a sigma as described in Equation 8 as follows, and the present embodiment of the present invention respectively uses the average lightness as '$x_0$', and the contrast threshold depending on the position and the area of the foreground image as the sigma.

$$S_i = \sum_{n=0}^{n=i} \frac{1}{\sqrt{2\pi}\sum} e^{-((100x_n/m - x_0)^2 / 2\sum^2)}$$

$$S_{LUT} = \frac{S_i - \min(S)}{\max(S) - \min(S)} (L_{maxout} - L_{minout}) + L_{minout},$$

[Equation 8]

where '$S_i$' denotes a cumulative standard normal distribution of an average '$x_0$' and a standard deviation '$\Sigma$', and '$m$' denotes a maximum lightness value. Here, '$i$' has a range of $0 \leq i \leq m$, and an output lightness value '$J_{out}$' enhancing a contrast of an input lightness value '$J_{in}$' is normalized into a maximum lightness value '$L_{maxout}$' and a minimum lightness value '$L_{minout}$' using a cumulative standard normal distribution value in the input lightness value as described in the second equation of the above-described Equation 8, and is finally obtained. In this case, the lightness value '$J_{in}$' of each pixel of the foreground image is enhanced to be the lightness value '$J_{out}$' based on the position and the area of the foreground image, and the average lightness after the lightness contrast enhancement.

Figure 7:
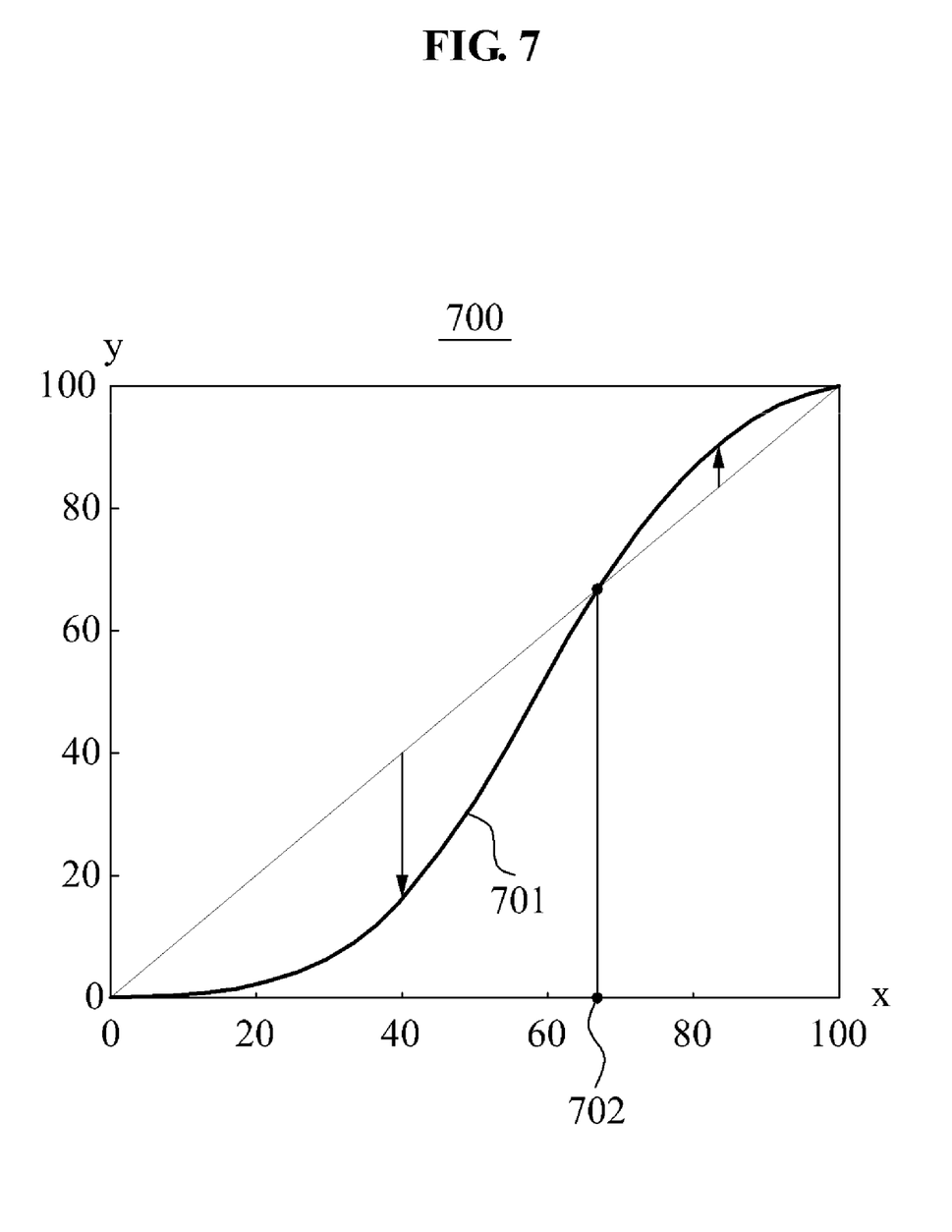
FIG. 7 illustrates a lightness contrast enhancement according to an embodiment of the present invention.

FIG. 7 illustrates a lightness contrast enhancement according to an embodiment of the present invention. In a graph 700, x-axis denotes an inputted lightness and y-axis denotes an outputted lightness. Specifically, a curve 701 illustrates that when the inputted light is less than an average lightness 702 by setting the average lightness 702 as a reference point, the outputted lightness decreases, and when the inputted light is greater than an average lightness 702, the outputted lightness increases. Specifically, it may be identified that the dark colors are enhanced to look darker, and the light colors are enhanced to look lighter.

Also, the immersive sensation enhancement method may identify a saturation enhancement scale based on the characteristic of the foreground image, and enhance an average saturation of the inputted foreground image based on the saturation enhancement scale. A color size effect denotes that a color stimulus in human eyes linearly increases with the increase of a reflected retina size in a fixed position, whereas the color stimulus linearly decreases with the increase of a retinal eccentricity for a fixed size. In the present embodiment of the present invention, the saturation of each pixel in the foreground image is enhanced based on the position, the area, and color information of the foreground image in order to simulate a human eye response. In this instance, the saturation enhancement scale '$K_S$' is defined by Equation 9:

$$K_S = K_A K_P \frac{\overline{C_F}}{100},$$

[Equation 9]

where '$\overline{C_F}$' is used for preserve a neutral color in an image and denotes an average saturation of a foreground image. Also, '$K_A$' and '$K_P$' described using the above-described Equation 6 and the above-described Equation 7 may express the human eye response to the area and the position of the foreground image.

When the saturation enhancement scale is identified as described above, the immersive sensation enhancement system may enhance the average saturation based on the saturation enhancement scale. For this, for example, a linear function in accordance with Equation 10 may be used for saturation enhancement for each pixel included in the foreground image:

$$C_{out} = K_S C_{in},$$

[Equation 10]

where $C_{in}$ and $C_{out}$ respectively denote an inputted saturation and an outputted saturation, and $K_S$ denotes a saturation enhancement scale for the saturation enhancement as described by the above-described Equation 9.

Figure 8:
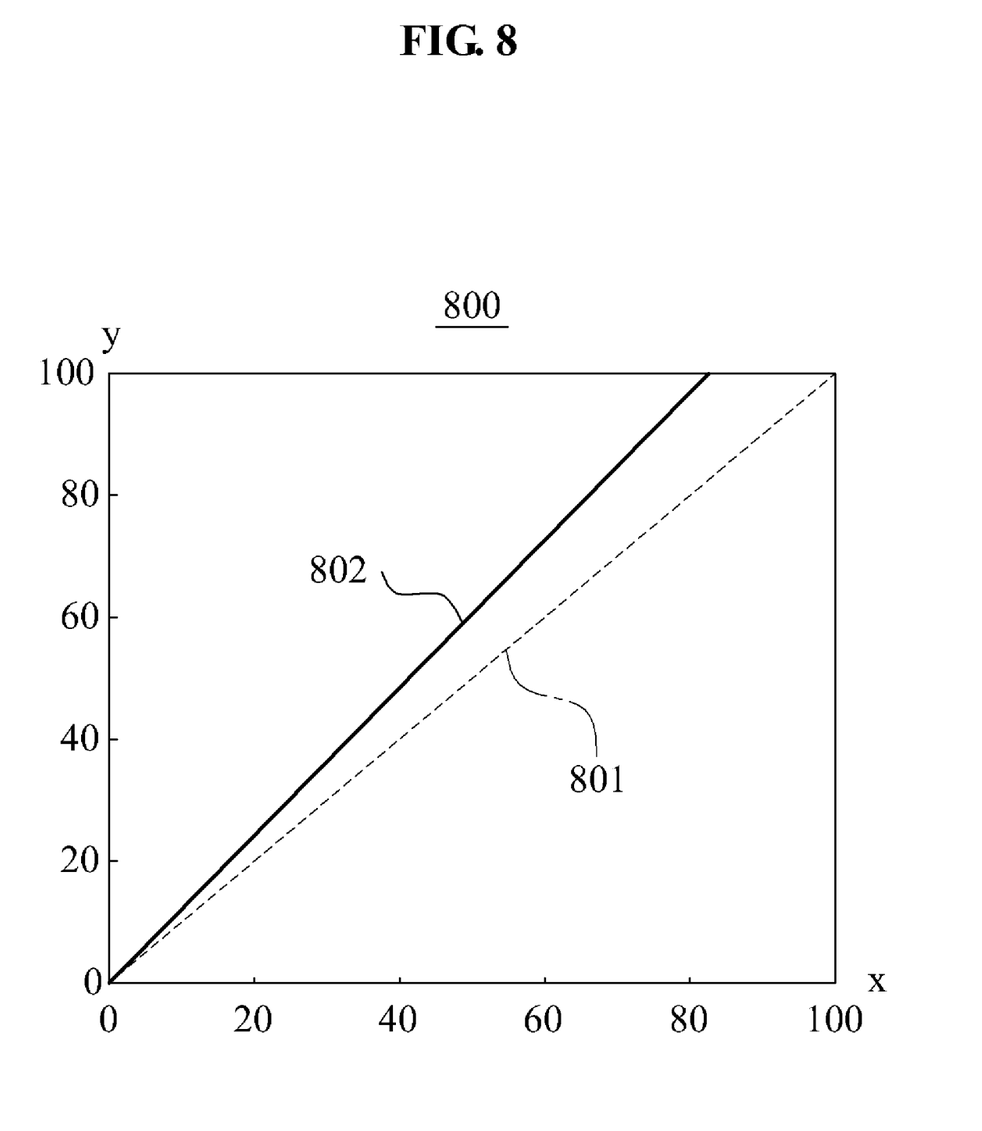
FIG. 8 illustrates a saturation enhancement according to an embodiment of the present invention.

FIG. 8 illustrates a saturation enhancement according to an embodiment of the present invention. In a graph 800, x-axis illustrates an inputted saturation and y-axis illustrates an outputted saturation. In this instance, a dotted straight line 801 and a solid straight line 802 are a result before the saturation enhancement and a result after the saturation enhancement. The straight lines 801 and 802 are forced to a point (0, 0) since the saturation of the neutral color is not changed by a change in size.

In operation S106, the immersive sensation enhancement method converts a color space of an output image. The immersive sensation enhancement method may acquire the enhanced lightness, the enhanced saturation, and the preserved hue for each pixel of the foreground image after the foreground image is enhanced. In this instance, a new enhanced image for each individual frame may be acquired by combining the enhanced foreground image and the preserved background image. Specifically, the output image may be acquired. In this instance, the immersive sensation enhancement system may convert the color space of the output image into an RGB digital signal such as an existing input image.

Figure 9:
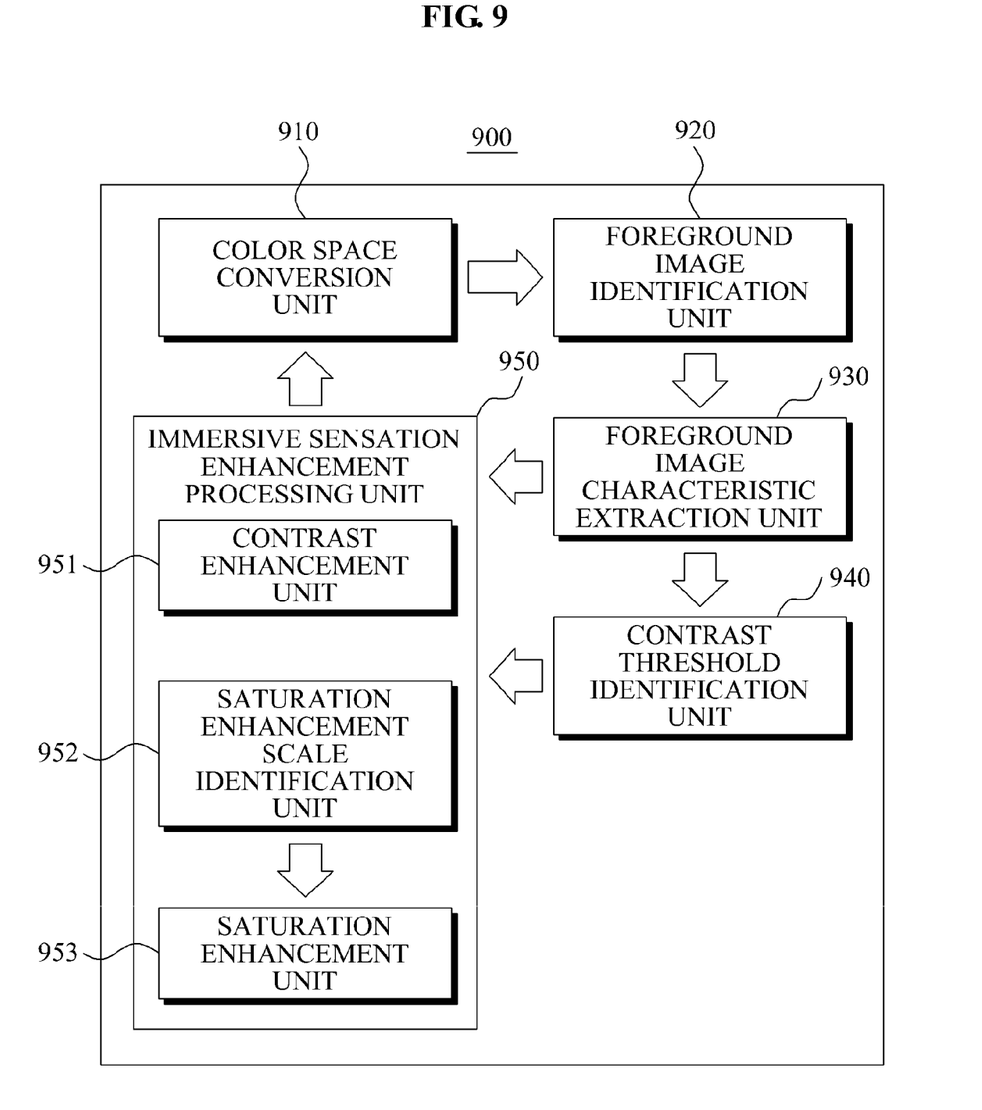
FIG. 9 is a block diagram illustrating an internal configuration of an immersive sensation enhancement system according to an embodiment of the present invention.

FIG. 9 is a block diagram illustrating an internal configuration of an immersive sensation enhancement system 900 according to an embodiment of the present invention. As illustrated in FIG. 9, the immersive sensation enhancement system 900 includes a color space conversion unit 910, a foreground image identification unit 920, a foreground image characteristic extraction unit 930, a contrast threshold identification unit 940, and an immersive sensation enhancement processing unit 950.

The color space conversion unit 910 converts a color space of at least one of an input image and an output image. In this instance, the color space conversion unit 910 processes a conversion between the color space based on RGB and the color space based on a human perceptual attribute, and the perceptual attribute includes at least one of a lightness, a saturation, and a hue.

The color space of the input image is an RGB digital signal and is unassociated with a human visual system. Accordingly, the color space may not be directly used for immersive generation. Specifically, a human perceptual attribute such as a lightness, a saturation, and a hue expressed as a final output of the human visual system may be used for the immersive generation. Accordingly, the color space conversion unit 910 may convert the color space of the RGB digital signal into the color space of the human perceptual attribute, and convert the color space of the immersive-enhanced output image into the color space of the original RGB digital signal again.

The foreground image identification unit 920 identifies a foreground image for each frame of an input image. In this instance, the foreground image identification unit 920 may include an information detection unit (not illustrated) to detect color information and smoothness information of a background image of the input image, a boundary detection unit (not illustrated) to detect a boundary of the background image based on the color information, and a boundary smoothing unit (not illustrated) to smooth the boundary based on the smoothness information.

The frame may be divided by different color areas based on different hues and different saturations. Accordingly, the foreground image identification unit 920 first calculates a ratio of a pixel included in each color area of a whole image, for example, a percentage, and calculates a smoothness of each color area. Specifically, the foreground image identification unit 920 may determine whether the color area is the background image based on the ratio calculated according to the color information and the smoothness. Also, the foreground image identification unit 920 assigns a background color to the color area determined to be the background image. For example, the foreground image identification unit 920 may assign the background color by changing all the color areas determined to be the background image into a black color. Finally, the foreground image identification unit 920 smoothes the boundary of the background image.

The foreground image characteristic extraction unit 930 extracts a characteristic of the foreground image. In this instance, the foreground image characteristic extraction unit 930 may identify a position of the foreground image in an entire area of the frame, and identify an area corresponding to the foreground image in the entire area. Also, the foreground image characteristic extraction unit 930 may calculate an average lightness and an average saturation of the foreground image. The position and the area of the foreground image are calculated by a unit of a degree corresponding to a human retinal eccentricity.

The contrast threshold identification unit 940 identifies a contrast threshold based on the characteristic of the foreground image. In this instance, the contrast threshold identification unit 940 identifies the contrast threshold based on a position and an area of the foreground image from the characteristic of the foreground image, the position and the area affecting a human retinal eccentricity and a reflected retina size.

The immersive sensation enhancement processing unit 950 processes an immersive sensation enhancement of the input image based on at least one of the characteristic of the foreground image and the contrast threshold. In this instance, as illustrated in FIG. 9, the immersive sensation enhancement processing unit 950 may include a contrast enhancement unit 951, a saturation scale identification unit 952, and a saturation enhancement unit 953 in order to process the immersive sensation enhancement of the input image.

The contrast enhancement unit 951 enhances a contrast of the foreground image based on the contrast threshold and the characteristic of the foreground image. In this instance, the contrast enhancement unit 951 enhances the contrast to an average lightness of the foreground image based on a sigmoidal function. For example, when the lightness of each pixel included in the foreground image is less than the average lightness, the lightness decreases, and when the lightness of each pixel included in the foreground image is greater than the average lightness, the lightness increases.

The saturation enhancement scale identification unit 952 identifies a saturation scale based on the characteristic of the foreground image, and the saturation enhancement unit 953 enhances an average saturation of the inputted foreground image based on the saturation enhancement scale. A color size effect denotes that a color stimulus in human eyes linearly increases with the increase of a reflected retina size in a fixed position, whereas the color stimulus linearly decreases with the increase of a retinal eccentricity for a fixed size. Accordingly, the saturation enhancement unit 953 may enhance the saturation of each pixel in the foreground image based on the position, the area, and color information of the foreground image in order to simulate a human eye response. Specifically, the saturation enhancement unit 953 may enhance the saturation of the foreground image by calculating the outputted saturation based on the saturation enhancement scale and the inputted saturation.

Figure 10:
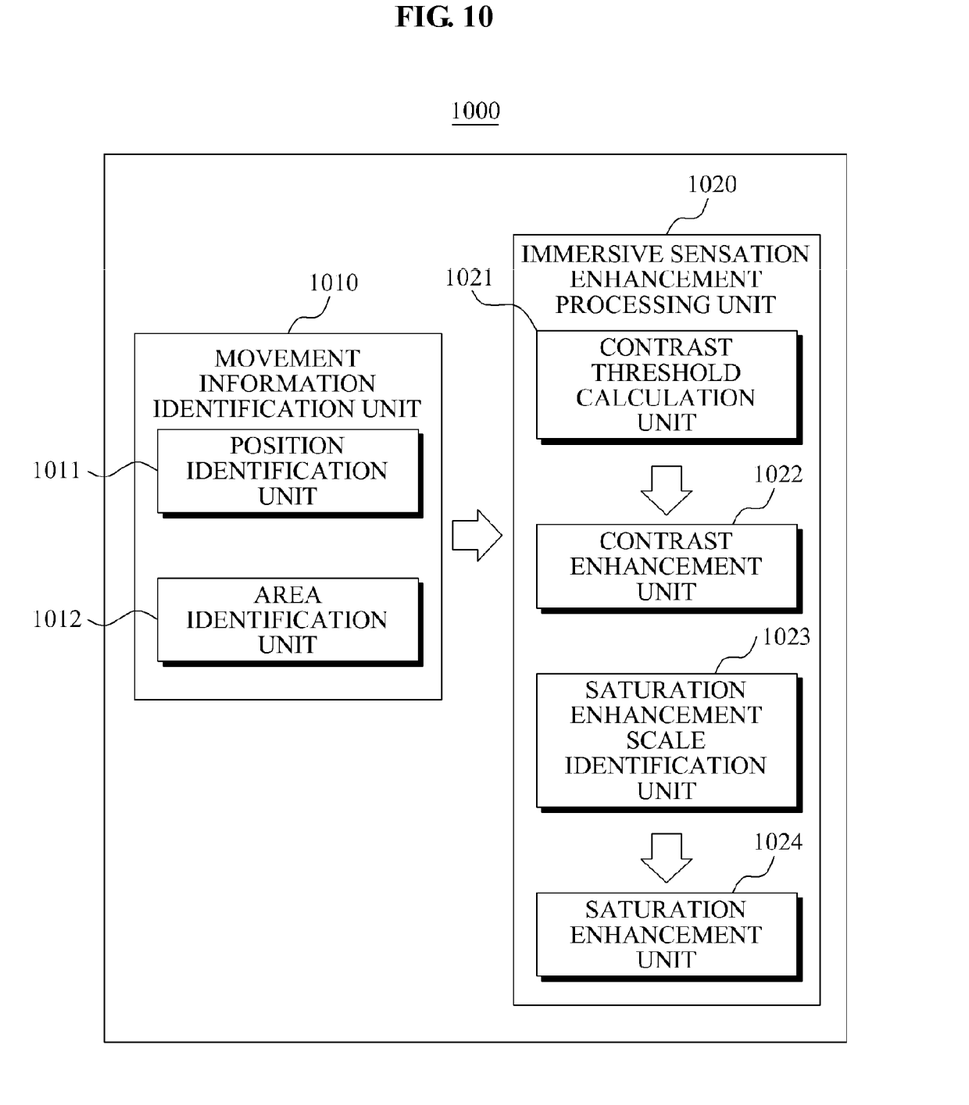
FIG. 10 is a block diagram illustrating an internal configuration of an immersive sensation enhancement system according to another embodiment of the present invention.

FIG. 10 is a block diagram illustrating an internal configuration of an immersive sensation enhancement system 1000 according to another embodiment of the present invention.

As illustrated in FIG. 10, the immersive sensation enhancement system 1000 may include a movement information identification unit 1010 and an immersive sensation enhancement processing unit 1020.

The movement information identification unit 1010 identifies movement information of a foreground image between frames of an input image. For this, as illustrated in FIG. 10, the movement information identification unit 1010 may include a position identification unit 1011 and an area identification unit 1012.

The position identification unit 1011 identifies a position of the foreground image for each frame based on a position of a pixel included in the foreground image, and the area identification unit 1012 identifies an area of the foreground image for each frame based on a ratio of a number of all pixels to a number of pixels of the foreground image. In this instance, the position and the area are expressed by a unit of a degree.

The immersive sensation enhancement processing unit 1020 processes an immersive sensation enhancement of the input image based on the movement information. The immersive sensation enhancement processing unit 1020 may include a contrast threshold calculation unit 1021, a contrast enhancement unit 1022, a saturation enhancement scale identification unit 1023, and a saturation enhancement unit 1024.

The contrast threshold calculation unit 1021 calculates a contrast threshold based on the position and the area, and the contrast enhancement unit 1022 enhances a contrast to a lightness of the foreground image based on the position, the area, and the contrast threshold.

The saturation enhancement scale identification unit 1023 identifies a saturation enhancement scale based on the position and the area, and the saturation enhancement unit 1024 enhances a saturation of the foreground image based on the saturation enhancement scale.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. An immersive sensation enhancement system, the system comprising:
    a foreground image identification unit to identify a foreground image for each frame of an input image;
    a foreground image characteristic extraction unit to extract a characteristic of the foreground image, among a plurality of characteristics;
    a contrast threshold identification unit to identify a contrast threshold, based on the extracted characteristic of the foreground image; and
    an immersive sensation enhancement processing unit to process an immersive sensation enhancement of the input image, such that a contrast of the foreground image is enhanced using the identified contrast threshold and the extracted characteristic of the foreground image,
    wherein the contrast threshold varies differently with respect to each of the plurality of characteristics of the foreground image.

2. The system of claim 1, wherein the foreground image identification unit comprises:
    an information detection unit to detect color information and smoothness information of a background image of the input image;
    a boundary detection unit to detect a boundary of the background image based on the color information; and
    a boundary smoothing unit to smooth the boundary based on the smoothness information.

3. The system of claim 1, wherein the foreground image characteristic extraction unit comprises:
    a position identification unit to identify a position of the foreground image in an entire area of the frame;
    an area identification unit to identify an area corresponding to the foreground image in the entire area; and
    a lightness and saturation calculation unit to calculate an average lightness and an average saturation of the foreground image.

4. The system of claim 3, wherein the position and the area of the foreground image are calculated by a unit of a degree corresponding to human retinal eccentricity.

5. An immersive sensation enhancement system, the system comprising:
    a foreground image identification unit to identify a foreground image for each frame of an input image;
    a foreground image characteristic extraction unit to extract a characteristic of the foreground image;
    a contrast threshold identification unit to identify a contrast threshold based on the characteristic of the foreground image; and
    an immersive sensation enhancement processing unit to process an immersive sensation enhancement of the input image based on at least one of the characteristic of the foreground image and the contrast threshold,
    wherein the contrast threshold identification unit identifies the contrast threshold based on a position and an area of the foreground image from the characteristic of the foreground image, the position and the area affecting human retinal eccentricity and a reflected retina size.

6. The system of claim 1, wherein the immersive sensation enhancement processing unit comprises:
    a contrast enhancement unit to enhance a contrast of the foreground image based on the contrast threshold and the characteristic of the foreground image.

7. The system of claim 6, wherein the contrast enhancement unit enhances the contrast to an average lightness of the foreground image based on a sigmoidal function.

8. An immersive sensation enhancement system, the system comprising:
    a foreground image identification unit to identify a foreground image for each frame of an input image;
    a foreground image characteristic extraction unit to extract a characteristic of the foreground image;
    a contrast threshold identification unit to identify a contrast threshold based on the characteristic of the foreground image; and
    an immersive sensation enhancement processing unit to process an immersive sensation enhancement of the input image based on at least one of the characteristic of the foreground image and the contrast threshold,
    wherein the immersive sensation enhancement processing unit comprises:
    a saturation enhancement scale identification unit to identify a saturation enhancement scale based on the characteristic of the foreground image; and
    a saturation enhancement unit to enhance an average saturation of the inputted foreground image based on the saturation enhancement scale.

9. The system of claim 8, wherein the saturation enhancement scale identification unit identifies the saturation enhancement scale based on a position and an area of the foreground image from the characteristic of the foreground image.

10. The system of claim 9, further comprising:
    a color space conversion unit to convert a color space of at least one of the input image and an output image.

11. The system of claim 10, wherein the color space conversion unit processes a conversion between the color space based on Red Green Blue (RGB) and the color space based on a human perceptual attribute, and
    the perceptual attribute includes at least one of a lightness, a saturation, and a hue.

12. An immersive sensation enhancement system, the system comprising:
    a movement information identification unit to identify movement information of a foreground image between frames of an input image; and
    an immersive sensation enhancement processing unit to process an immersive sensation enhancement of the input image, such that a contrast of the foreground image is enhanced using an identified contrast threshold and the movement information,
    wherein the contrast threshold varies differently with respect to the movement information of the foreground image.

13. The system of claim 12, wherein the movement information identification unit comprises:
    a position identification unit to identify a position of the foreground image for each frame based on a position of a pixel included in the foreground image; and an area identification unit to identify an area of the foreground image for each frame based on a ratio of a number of all pixels to a number of pixels of the foreground image,
wherein the position and the area are expressed by a unit of a degree.

14. An immersive sensation enhancement system, the system comprising:
   a movement information identification unit to identify movement information of a foreground image between frames of an input image; and
   an immersive sensation enhancement processing unit to process an immersive sensation enhancement of the input image based on the movement information,
   wherein the movement information includes information about a position and an area of the foreground image, and
   the immersive sensation enhancement processing unit comprises:
   a contrast threshold calculation unit to calculate a contrast threshold based on the position and the area; and
   a contrast enhancement unit to enhance a contrast to a lightness of the foreground image based on the position, the area, and the contrast threshold.

15. The system of claim 12, wherein the movement information includes information about a position and an area of the foreground image, and
   the immersive sensation enhancement processing unit comprises:
   a saturation enhancement scale identification unit to identify a saturation enhancement scale based on the position and the area; and
   a saturation enhancement unit to enhance a saturation of the foreground image based on the saturation enhancement scale.

16. An immersive sensation enhancement method, the method comprising:
   identifying, by a processor, a foreground image for each frame of an input image;
   extracting a characteristic of the foreground image, among a plurality of characteristics;
   identifying a contrast threshold based on the extracted characteristic of the foreground image; and
   processing an immersive sensation enhancement of the input image, such that a contrast of the foreground image is enhanced using the identified contrast threshold and the extracted characteristic of the foreground image,
   wherein the contrast threshold varies differently with respect to each of the plurality of characteristics of the foreground image.

17. An immersive sensation enhancement method, the method comprising:
   identifying, by a processor, a foreground image for each frame of an input image;
   extracting a characteristic of the foreground image;
   identifying a contrast threshold based on the characteristic of the foreground image; and
   processing an immersive sensation enhancement of the input image based on at least one of the characteristic of the foreground image and the contrast threshold,
   wherein the extracting comprises:
   identifying a position of the foreground image in an entire area of the frame;
   identifying an area corresponding to the foreground image in the entire area; and
   calculating an average lightness and an average saturation of the foreground image.

18. An immersive sensation enhancement method, the method comprising:
   identifying, by a processor, a foreground image for each frame of an input image;
   extracting a characteristic of the foreground image;
   identifying a contrast threshold based on the characteristic of the foreground image; and
   processing an immersive sensation enhancement of the input image based on at least one of the characteristic of the foreground image and the contrast threshold,
   wherein the identifying of the contrast threshold comprises identifying the contrast threshold based on a position and an area of the foreground image from the characteristic of the foreground image, the position and the area affecting human retinal eccentricity and a reflected retina size.

19. The method of claim 16, wherein the processing comprises enhancing a contrast of the foreground image based on the contrast threshold and the characteristic of the foreground image.

20. The method of claim 19, wherein the enhancing comprises enhancing the contrast to an average lightness of the foreground image based on a sigmoidal function.

21. An immersive sensation enhancement method, the method comprising:
   identifying, by a processor, a foreground image for each frame of an input image;
   extracting a characteristic of the foreground image;
   identifying a contrast threshold based on the characteristic of the foreground image; and
   processing an immersive sensation enhancement of the input image based on at least one of the characteristic of the foreground image and the contrast threshold,
   wherein the processing comprises:
   identifying a saturation enhancement scale based on the characteristic of the foreground image; and
   enhancing an average saturation of the inputted foreground image based on the saturation enhancement scale.

22. The method of claim 16, further comprising:
   converting a color space of at least one of the input image and an output image,
   wherein the converting comprises processing a conversion between the color space based on RGB and the color space based on a human perceptual attribute.

* * * * *